US012598407B2

(12) United States Patent
Wang et al.

(10) Patent No.: US 12,598,407 B2
(45) **Date of Patent: *Apr. 7, 2026**

(54) WEARABLE DEVICE AND WEARABLE MEMBER THEREOF

(71) Applicant: SHENZHEN SHOKZ CO., LTD., Shenzhen (CN)

(72) Inventors: Zhen Wang, Shenzhen (CN); Zhiqing Liu, Shenzhen (CN); Xin Fu, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 319 days.

This patent is subject to a terminal disclaimer.

(21) Appl. No.: 18/351,516

(22) Filed: Jul. 13, 2023

(65) Prior Publication Data

US 2023/0362523 A1 Nov. 9, 2023

Related U.S. Application Data

(63) Continuation of application No. PCT/CN2022/139085, filed on Dec. 14, 2022.

(30) Foreign Application Priority Data

Jan. 27, 2022 (CN) ........................ 202210101581.2
Jan. 27, 2022 (CN) ........................ 202210101586.5
(Continued)

(51) Int. Cl.
*H04R 25/00* (2006.01)
*H04R 1/02* (2006.01)
*H04R 1/10* (2006.01)

(52) U.S. Cl.
CPC .......... *H04R 1/025* (2013.01); *H04R 1/1091* (2013.01)

(58) Field of Classification Search
CPC .............................. H04R 1/025; H04R 1/1091
(Continued)

(56) References Cited

U.S. PATENT DOCUMENTS 6,695,773 B1 2/2004 Dahlinger
7,310,072 B2 * 12/2007 Ronzani ............ G02B 27/0176 345/7

(Continued)

FOREIGN PATENT DOCUMENTS

CN 210183483 U 3/2020
CN 210807564 U 6/2020

(Continued)

OTHER PUBLICATIONS

Notice of Reasons for Rejection in Japanese Application No. 2023551200 mailed on Oct. 8, 2024, 6 pages.

(Continued)

*Primary Examiner* — William J Deane, Jr.
(74) *Attorney, Agent, or Firm* — METIS IP LLC

(57) ABSTRACT

The embodiments of the present disclosure provide wearable devices and wearable members. The wearable member may include: a housing including a concave section, wherein a top wall of the concave section forms a downward hollow in a wearing state, and a bottom wall of the concave section includes a first sound output hole; and a speaker disposed in the concave section, wherein a resonant cavity is formed between the speaker and a first sidewall of the housing, and the first sound output hole communicates with the resonant cavity.

20 Claims, 10 Drawing Sheets

(30) Foreign Application Priority Data

| | | |
|---|---|---|
| Jan. 27, 2022 | (CN) | 202220233971.0 |
| Jan. 27, 2022 | (CN) | 202220235622.2 |

(58) Field of Classification Search
USPC ........................................ 381/388, 301, 333
See application file for complete search history.

(56) References Cited

U.S. PATENT DOCUMENTS

| | | | | |
|---|---|---|---|---|
| 7,760,898 | B2 * | 7/2010 | Howell | H04R 5/0335 381/381 |
| 10,353,221 | B1 * | 7/2019 | Graff | G02C 5/2209 |
| 11,206,477 | B2 | 12/2021 | Xiao et al. | |
| 2003/0067585 | A1 | 4/2003 | Miller et al. | |
| 2006/0034478 | A1 * | 2/2006 | Davenport | G02C 11/10 381/381 |
| 2010/0045928 | A1 * | 2/2010 | Levy | G02C 11/10 351/158 |
| 2015/0319546 | A1 | 11/2015 | Sprague | |
| 2017/0034611 | A1 | 2/2017 | Maruyama | |
| 2018/0063610 | A1 | 3/2018 | Tanabe et al. | |
| 2019/0285913 | A1 * | 9/2019 | Howell | G02C 5/143 |
| 2020/0213741 | A1 | 7/2020 | Shen et al. | |
| 2021/0044882 | A1 * | 2/2021 | Jain | G10K 11/178 |
| 2021/0240007 | A1 * | 8/2021 | Hicks | H04R 1/08 |
| 2021/0263479 | A1 | 8/2021 | Zhang et al. | |
| 2022/0021959 | A1 * | 1/2022 | Andrikowich | H01R 13/629 |
| 2023/0112380 | A1 * | 4/2023 | Jang | H01Q 21/28 343/702 |
| 2024/0380103 | A1 * | 11/2024 | Nam | H01Q 5/30 |

FOREIGN PATENT DOCUMENTS

| | | | |
|---|---|---|---|
| CN | 111970596 | A | 11/2020 |
| CN | 213485164 | U | 6/2021 |
| CN | 214704204 | U | 11/2021 |
| CN | 113805361 | A | 12/2021 |
| CN | 215264275 | U | 12/2021 |
| CN | 215642098 | U | 1/2022 |
| CN | 215932289 | U | 3/2022 |
| CN | 216145034 | U | 3/2022 |
| CN | 114545655 | A | 5/2022 |
| CN | 217388952 | U | 9/2022 |
| CN | 217428319 | U | 9/2022 |
| JP | 2009055248 | A | 3/2009 |
| TW | 201136337 | A | 10/2011 |
| WO | 2021129456 | A1 | 7/2021 |

OTHER PUBLICATIONS

The Extended European Search Report in European Application No. 22919284.4 mailed on Jun. 18, 2024, 8 pages.

International Search Report in PCT/CN2022/139085 mailed on Feb. 22, 2023, 7 pages.

First Examination Report in Indian Application No. 202317049597 mailed on Oct. 31, 2025, 6 pages.

The Third Office Action in Chinese Application No. 202210101581.2 mailed on Jan. 19, 2026, 10 pages.

* cited by examiner

WEARABLE DEVICE AND WEARABLE MEMBER THEREOF

CROSS-REFERENCE TO RELATED APPLICATIONS

This application is a Continuation of International Application No. PCT/CN2022/139085, filed on Dec. 14, 2022, which claims priority to Chinese Patent Application No. 202210101586.5, Chinese Patent Application No. 202210101581.2, Chinese Patent Application No. 202220235622.2, and Chinese Patent Application No. 202220233971.0, filed on Jan. 27, 2022, entitled "Wearable Device and Wearable Member Thereof," the contents of each of which are hereby incorporated by reference.

TECHNICAL FIELD

The present disclosure relates to wearable device technology field, and in particularly, to a wearable device and a wearable member thereof.

BACKGROUND

With Google Glass first released by Google in 2012, the concept of wearable devices such as smart glasses has become familiar to the public. The mature wearable devices nowadays include smart watches, virtual reality (VR)/augmented reality (AR) head displays, smart glasses, or the like.

The smart glasses have the function of outputting sounds. The smart glasses often have poor sound quality due to various reasons.

SUMMARY

The present disclosure provides wearable devices and wearable members thereof, to solve the problem of the poor sound quality of the smart glasses.

In order to solve the above technical problem, the present disclosure provides a wearable member. The wearable member may include: a housing including a concave section, wherein a top wall of the concave section may form a downward hollow in a wearing state, and a bottom wall of the concave section may include a first sound output hole; and a speaker disposed in the concave section, wherein a resonant cavity may be formed between the speaker and a first sidewall of the housing, and the first sound output hole may communicate with the resonant cavity.

In some embodiments, in a direction related to a space between the speaker and the first sidewall of the housing, a thickness of one end of the resonant cavity close to the first sound output hole may be greater than a thickness of one end of the resonant cavity away from the first sound output hole.

In some embodiments, the thickness of the resonant cavity gradually may decrease along a direction from the end of the resonant cavity closed to the first sound output hole to the end of the resonant cavity away from the first sound output hole.

In some embodiments, the wearable member may include a shield disposed between the speaker and the housing, wherein the resonant cavity may be formed between the speaker and the shield; and a distance between one end of the shield close to the first sound output hole and a diaphragm plane of the speaker may be greater than a distance between one end of the shield away from the first sound output hole and the diaphragm plane of the speaker.

In some embodiments, the shield may include a first cover and a second cover connected to each other, a distance between the first cover and the diaphragm plane of the speaker may be greater than a distance between the second cover and the diaphragm plane of the speaker, and the first cover may be disposed adjacent to the first sound output hole.

In some embodiments, the first cover may have a first plane towards the speaker, the second cover may have a second plane towards the speaker, and the first plane and the second plane may be parallel to the diaphragm plane of the speaker, respectively.

In some embodiments, the shield may further include a third cover, the third cover may be connected between the first cover and the second cover, the third cover may have a transition surface towards the speaker, two opposite edges of the transition surface may connect the first plane and the second plane, respectively, and a distance between the transition surface and the diaphragm plane of the speaker gradually may decrease from the first plane to the second plane.

In some embodiments, the resonant cavity may be directly formed between the speaker and the first sidewall of the housing, a distance between one end of the sidewall of the housing close to the first sound output hole and a diaphragm plane of the speaker may be greater than a distance between one end of the sidewall of the housing away from the first sound output hole and the diaphragm plane of the speaker.

In some embodiments, the bottom wall of the concave section may include the first sound output hole and a second sound output hole; the first sound output hole may be disposed corresponding to a bottom of the hollow; the second sound output hole may communicate with the resonant cavity; the first sound output hole and the second sound output hole may be relatively located on adjacent sides of the resonant cavity; the first sound output hole and the second sound output hole may be both configured for outputting sound; and the second sound output hole may be further configured for improving a resonant frequency of the resonant cavity.

In some embodiments, a shape of a cross-section of the resonant cavity perpendicular to a direction related to a space between the speaker and the first sidewall of the housing may be a rectangle, and the first sound output hole and the second sound output hole may be disposed on a first side and a second side of the rectangle adjacent to each other, respectively.

In some embodiments, a ratio of a length of the second sound output hole along an extension direction of the second side to a length of the second side may be greater than or equal to 0.1 and less than or equal to 0.7.

In some embodiments, the second sound output hole may extend from one end of the second side close to the first side to the other end of the second side away from the first side; and the first side may be a short side of the rectangle, and the second side may be a long side of the rectangle.

In some embodiments, the second sound output hole and the first sound output hole may be disposed on the bottom wall at intervals; or the second sound output hole may communicate with the first sound output hole on the bottom wall.

In some embodiments, the concave section may include a first bending portion and a second bending portion, the first bending portion may be in bending connection with the second bending portion, the hollow may be formed between a top wall of the first bending portion and a top wall of the second bending portion, and the speaker may be disposed on the second bending portion; and the bottom wall of the concave section may include a first bottom surface, a second bottom surface, and a third bottom surface, the first bottom surface may be in bending connection with the second bottom surface, the second bottom surface may be in bending connection with the third bottom surface, the first bottom surface may be located at the first bending portion, the second bottom surface and the third bottom surface are located at the second bending portion, the first sound output hole may be disposed on the second bottom surface, and the second sound output hole may be disposed on the third bottom surface.

In some embodiments, the first sidewall may face a head of a user in the wearing state, and a side of the speaker away from the resonant cavity may be attached to a second sidewall of the concave section.

In some embodiments, the second sidewall may further include at least one soundproof hole, the soundproof hole may be disposed on the second bending portion, and the speaker may cover the soundproof hole.

In some embodiments, the hollow may be arranged with a first sound pickup hole, the wearable member may further include a first sound pickup member, and the first sound pickup member may be disposed on the first bending portion and configured to pickup sounds through the first sound pickup hole.

In some embodiments, the second sidewall may further include a second sound pickup hole, the wearable member may further include a second sound pickup member, the second sound pickup member may be disposed on the second bending portion and located at a side of the speaker away from an end of the first bending portion, and the second sound pickup portion may be configured to pickup sounds through the second sound pickup hole.

In order to solve the above technical problem, the present disclosure provides a wearable device. The wearable device may include a visualization member and the wearable member above, wherein the wearable member may be connected with the visualization member.

The beneficial effects of the present disclosure include the followings. Different from the prior art, the present disclosure provides a wearable device and a wearable member thereof. A housing may include a concave section, wherein a top wall of the concave section forms a downward hollow in a wearing state, a speaker is disposed in the concave section and a resonant cavity is formed between the speaker and a first sidewall of the housing, and a bottom wall of the concave section includes a first sound output hole. The first sound output hole communicates with the resonant cavity such that the first sound output hole is closer to an opening of an ear canal in the wearing state, thereby improving the sound quality.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein.

DETAILED DESCRIPTION

Figure 1:
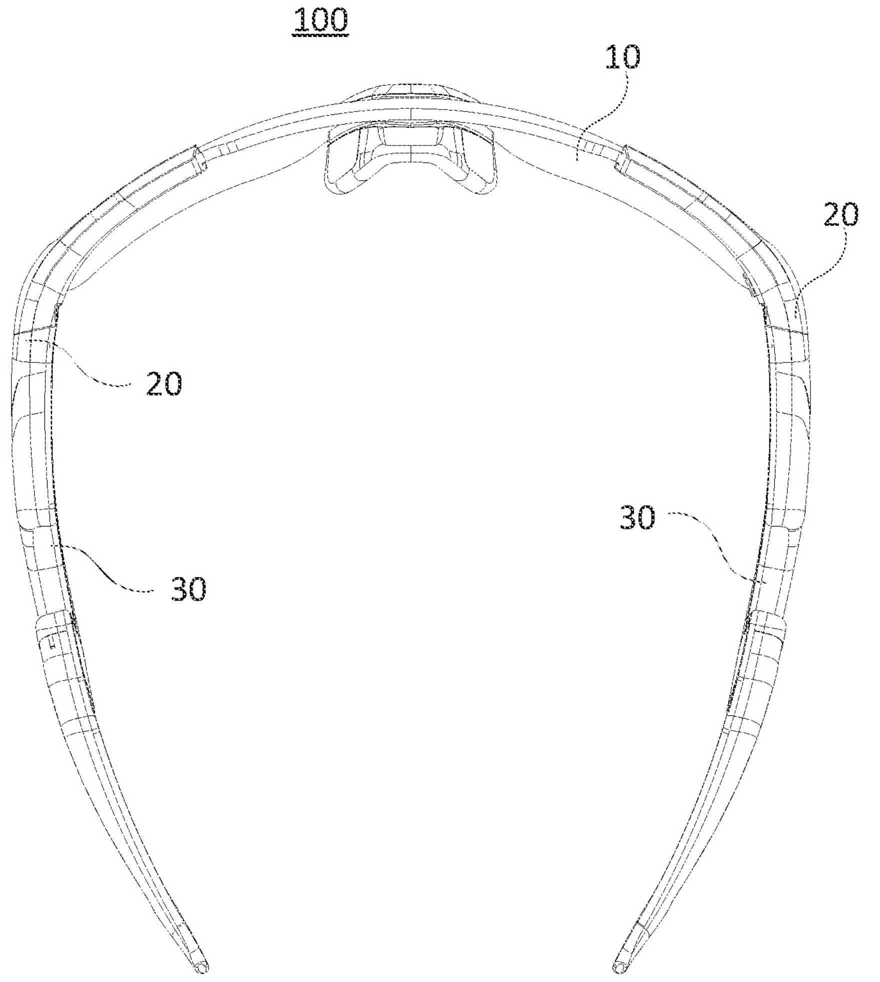
FIG. 1 is a schematic diagram illustrating an exemplary structure of a wearable device according to some embodiments of the present disclosure.

To more clearly illustrate the technical solutions related to the embodiments of the present disclosure, a brief introduction of the drawings referred to the description of the embodiments is provided below. Obviously, the accompanying drawing in the following description is merely some examples or embodiments of the present disclosure, for those skilled in the art, the present disclosure may further be applied in other similar situations according to the drawings without any creative effort. Unless obviously obtained from the context or the context illustrates otherwise, the same numeral in the drawings refers to the same structure or operation.

As used in the disclosure and the appended claims, the singular forms "a," "an," and "the" include plural referents unless the content clearly dictates otherwise. Generally speaking, the terms "comprise" and "include" only imply that the clearly identified steps and elements are included, and these steps and elements may not constitute an exclusive list, and the method or device may further include other steps or elements.

The "embodiments" in the present disclosure means that specific features, structures, or characteristics described in conjunction with the embodiments can be included in at least one embodiment of the present disclosure. The phrase appearing in various positions in the specification does not necessarily refer to the same embodiment, nor is it an independent or alternative embodiment that is mutually exclusive with other embodiments. Those skilled in the art may explicitly and implicitly understand that the embodiments described in the present can be combined with other embodiments.

Figure 2:
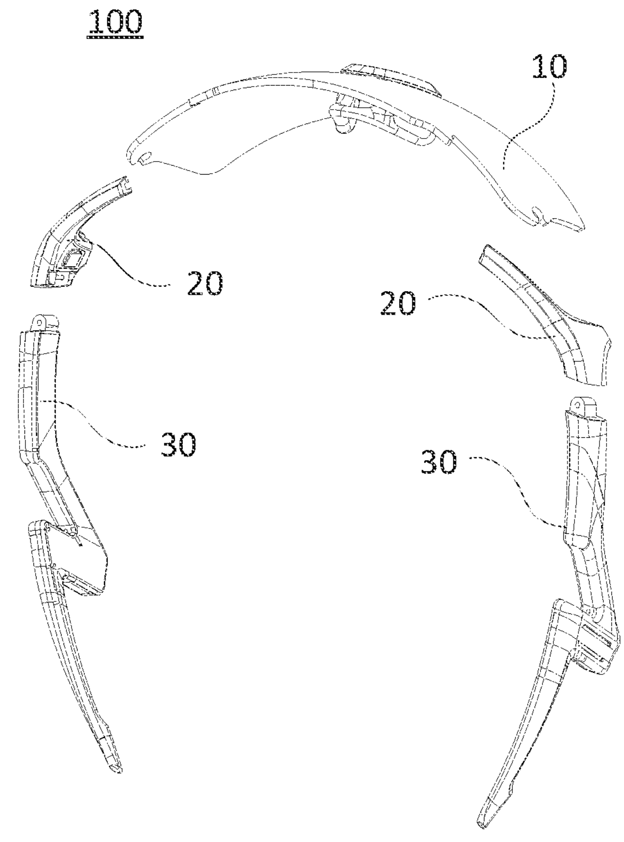
FIG. 2 is a schematic diagram illustrating an exemplary decomposition structure of the wearable device shown in FIG. 1 according to some embodiments of the present disclosure.

The present disclosure provides a wearable device 100. As shown in FIG. 1 and FIG. 2, FIG. 1 is a schematic diagram illustrating an exemplary structure of a wearable device according to some embodiments of the present disclosure, and FIG. 2 is a schematic diagram illustrating an exemplary decomposition structure of the wearable device shown in FIG. 1 according to some embodiments of the present disclosure.

The wearable device 100 may include glasses, smart bracelets, headphones, hearing aids, smart helmets, smart watches, smart clothing, smart backpacks, smart accessories, etc., or any combination thereof. For example, the wearable device 100 may be functional myopia glasses, reading glasses, cycling glasses, sunglasses, or intelligent glasses, such as audio glasses with an earphone function. The wearable device 100 may also include headset devices such as helmets, augmented reality (AR) devices, virtual reality (VR) devices, etc.

In some embodiments, the augmented reality devices or virtual reality devices may include virtual reality helmets, virtual reality glasses, augmented reality helmets, augmented reality glasses, etc., or any combination thereof. For example, the virtual reality devices and/or augmented reality devices may include Google Glass, Oculus Rift, Hololens, Gear VR, or the like.

The wearable device 100 may include a visualization member 10, a quick disassembly component 20, and a wearable member 30. The visualization member 10 and the wearable member 30 may be connected with two ends of the quick disassembly component 20, respectively, both the visualization member 10 and the wearable member 30 may be quickly disassembled from the quick disassembly component 20. The wearable member 30 may also be disposed as a conventional connection structure or an integrated structure with the quick disassembly component 20.

In some embodiments, the wearable device 100 may be a headset device. The visualization member 10 may be a lens, a display screen, or a display screen with a lens function. The visualization member 10 may further include a lens and an auxiliary part thereof, or a display screen and an auxiliary part thereof. The auxiliary part may include a glass frame or a frame, etc., to facilitate a connection with the quick disassembly component 20.

Optionally, the visualization member 10 may also include a dial structure with a display function.

In some embodiments, the wearable device 100 may include glasses, the visible member 10 may include a frame, and the wearable member 30 may include temples. The wearable device 100 may include a visible member 10, two groups of quick disassembly components 20, and two groups of wearable members 30. The two groups of quick disassembly components 20 may be disposed at both ends of the visualization member 10, and the two groups of wearable members 30 may be connected with a corresponding group of quick disassembly components 20, respectively.

Optionally, the wearable member 30 may include a headband, a watch strap, or the like. The both ends of the wearable member 30 may be connected with the corresponding groups of quick disassembly components 20, respectively. One end of the wearable member 30 may be connected with a group of quick disassembly components 20, and another end of the wearable member 30 may be connected with the visualization member 10.

In some embodiments, the wearable device 100 may not include the quick disassembly components 20, and the two ends of the visualization member 10 may be connected with the wearable member 30.

In other words, the wearable member 30 may be directly connected with the visualization member 10 or indirectly connected with the visualization member 10 through the quick disassembly components 20.

Figure 3:
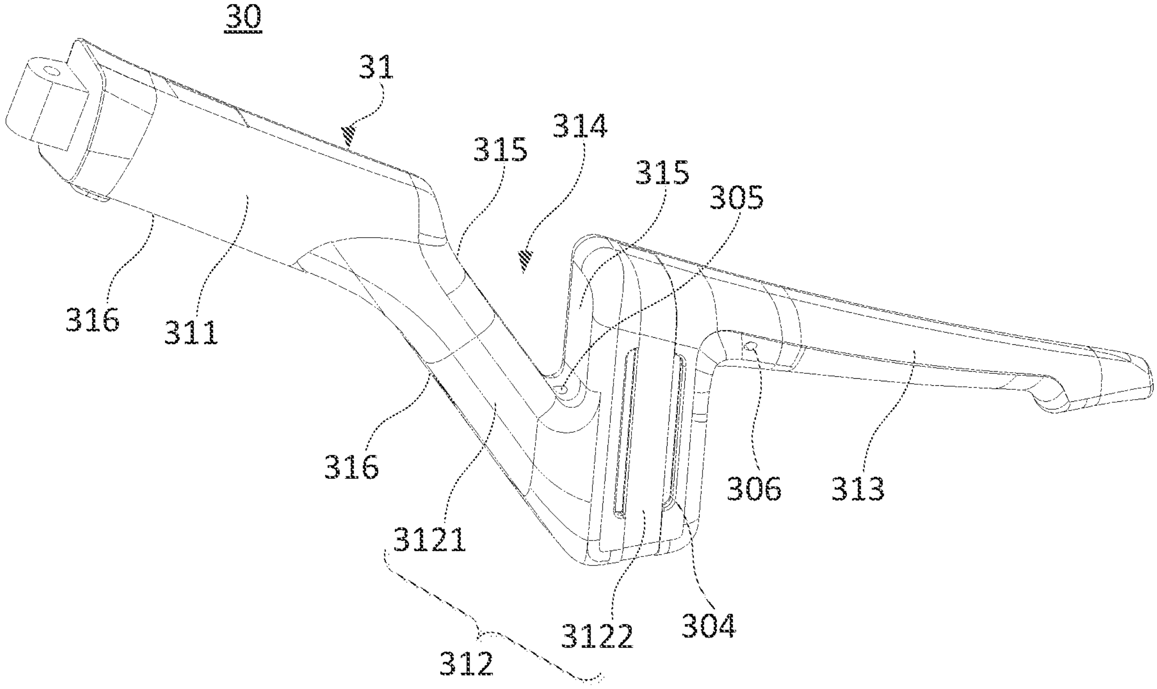
FIG. 3 is a schematic diagram illustrating an exemplary axial structure of a wearable member in the wearable device shown in FIG. 2 according to some embodiments of the present disclosure.
Figure 4:
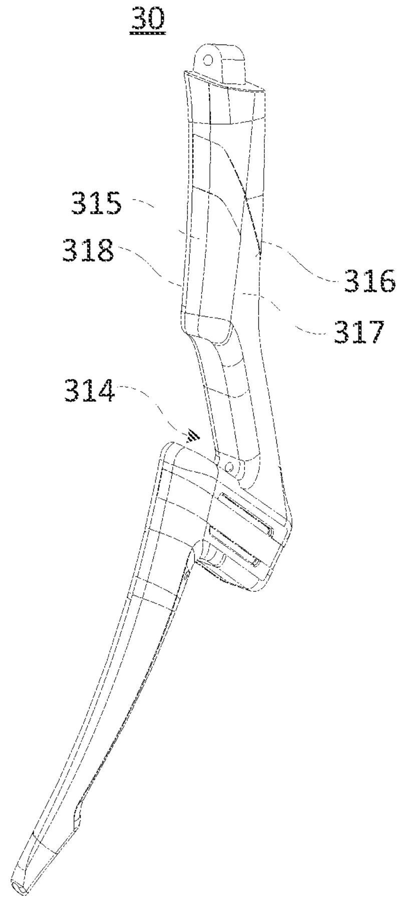
FIG. 4 is a schematic diagram illustrating another exemplary axial structure of the wearable member shown in FIG. 3 according to some embodiments of the present disclosure.
Figure 5:
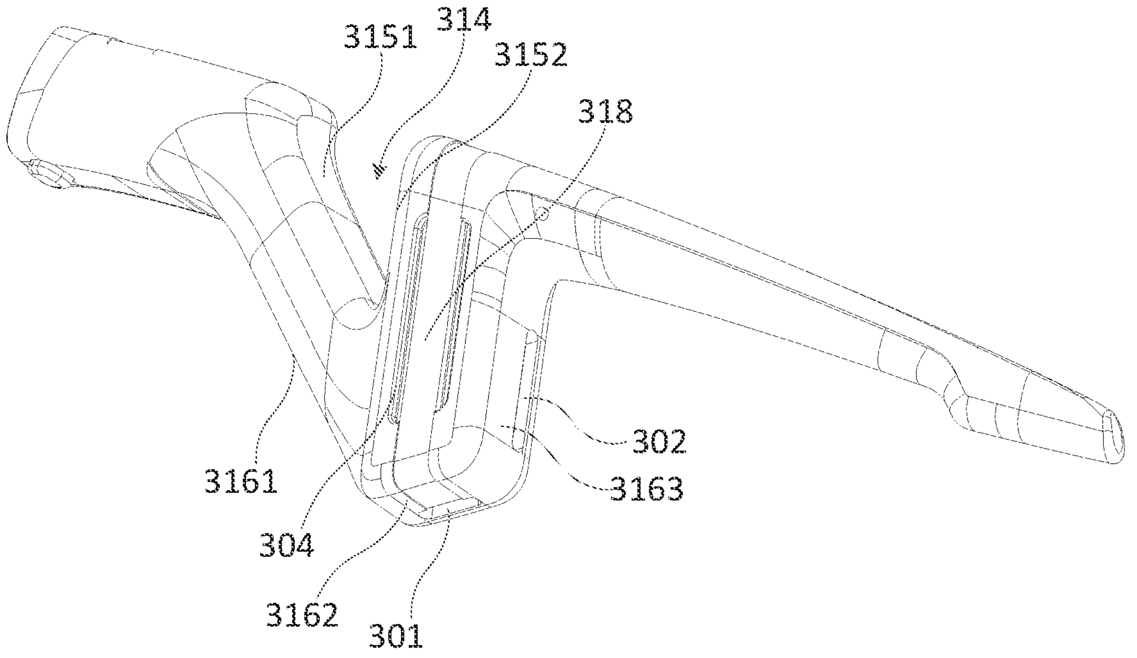
FIG. 5 is a schematic diagram illustrating another exemplary axial structure of the wearable member shown in FIG. 3 according to some embodiments of the present disclosure.
Figure 6:
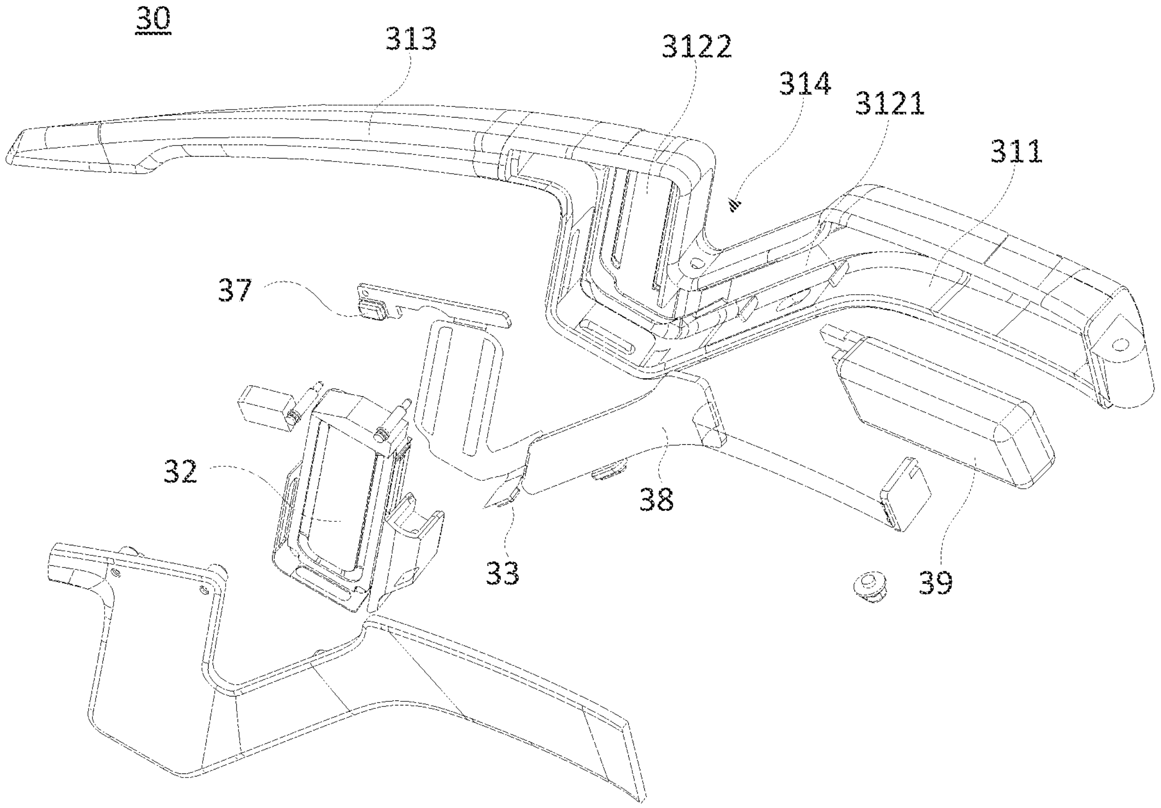
FIG. 6 is a schematic diagram illustrating an exemplary decomposition structure of the wearable member shown in FIG. 3 according to some embodiments of the present disclosure.
Figure 7:
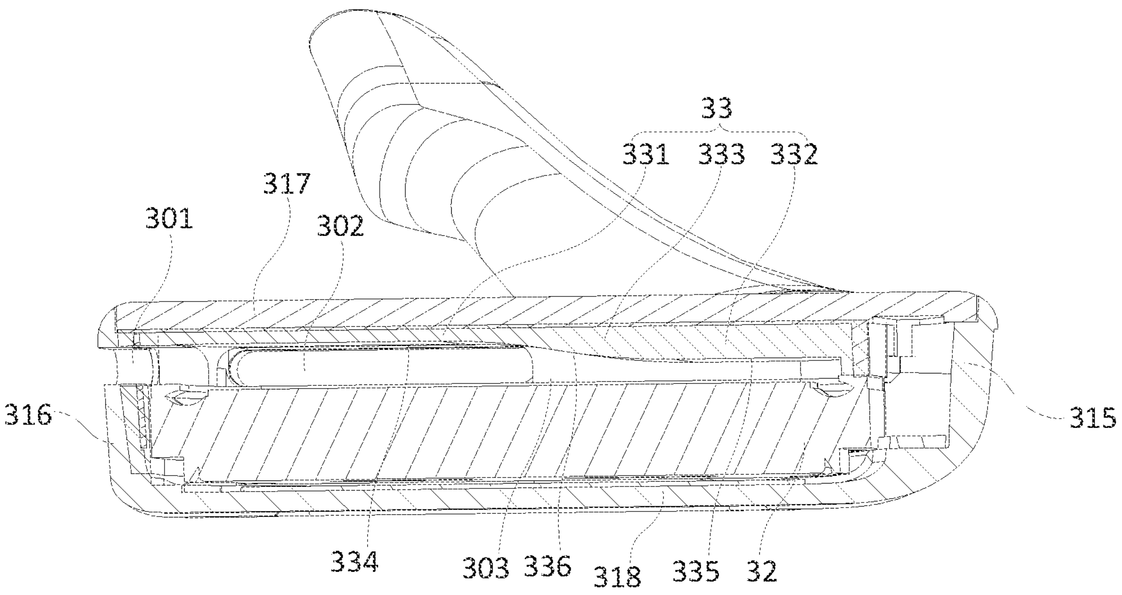
FIG. 7 is a schematic diagram illustrating an exemplary cross-sectional structure of the wearable member shown in FIG. 3 according to some embodiments of the present disclosure.

Referring to FIGS. 3-6, FIG. 3 is a schematic diagram illustrating an exemplary axial structure of a wearable member in the wearable device shown in FIG. 2 according to some embodiments of the present disclosure, FIG. 4 is a schematic diagram illustrating another exemplary axial structure of the wearable member shown in FIG. 3 according to some embodiments of the present disclosure, FIG. 5 is a schematic diagram illustrating another exemplary axial structure of the wearable member shown in FIG. 3 according to some embodiments of the present disclosure, FIG. 6 is a schematic diagram illustrating an exemplary decomposition structure of the wearable member shown in FIG. 3 according to some embodiments of the present disclosure, and FIG. 7 is a schematic diagram illustrating an exemplary cross-sectional structure of the wearable member shown in FIG. 3 according to some embodiments of the present disclosure.

The wearable member 300 may include a housing 31 and a speaker 32, the housing may include a concave section 312, the concave section 312 may form a downward hollow 314 in a wearing state, and the concave section 312 may include a first sound output hole 301. The speaker 32 may be disposed in the concave section 312, a resonant cavity 303 may be formed between the speaker 31 and a first sidewall 317 of the housing 31, the first sound output hole 301 may communicate with the resonant cavity 303, and the first sound output hole 301 may be configured to output sounds. In a direction related to a space between the speaker 32 and a sidewall of the housing 31, a thickness of one end of the resonant cavity 303 close to the first sound output hole 301 is greater than a thickness of one end of the resonant cavity 303 away from the first sound output hole 301 such that a length of the resonant cavity 303 is relatively shorten and a resonant frequency of the resonant cavity 303 is increased.

Specifically, the housing 31 may include a top wall 315, a bottom wall 316, a first sidewall 317, and a second sidewall 318. The first sidewall 317, the top wall 315, the second sidewall 318, and the bottom wall 316 may form the housing 31. In the wearing state, the first sidewall 317 may be attached to a head of a user, and the second sidewall 317 may be facing away from the head of the user.

In some embodiments, as shown in FIG. 7, the resonant cavity 303 may be formed between the speaker 32 and the first sidewall 317 of the housing 31. In some embodiments, the resonant cavity 303 may be formed between the speaker 32 and the second sidewall 318 of the housing 31. The first sound output hole 301 may be disposed on the bottom wall 316.

In some embodiments, as shown in FIG. 3, the housing 31 may further include a first connecting section 311 and a second connecting section 313. The first connecting section 311 is connected with the concave section 312, and the concave section 312 is connected with second connecting section 313. One end of the first connecting section 311 away from the concave section 312 may be hinged with the quick disassembly component 20, and the second connecting section 313 may be configured to hang on an auricle of the user.

The top wall 315, the bottom wall 316, the first sidewall 317, and the second sidewall 318 may constitute the first connecting section 311, the concave section 312, and the second connecting section 313.

Optionally, the housing 31 may include a plurality of concave sections 312, and at least one of the concave sections 312 may be configured to hang on the auricle of the user. The concave section 312 adjacent to the quick disassembly component 20 may be hinged with the quick disassembly component 20; or the housing 31 may include the concave section 312 and a second connecting section 313, and one end of the concave section 312 away from the second connecting section 313 may be hinged with the quick disassembly component 20.

Further, as shown in FIG. 5, taking a scenario where the user wears the wearable device 100 as an example, in the wearing state, the concave section 312 may form a downward hollow 314. That is, the concave section 312 extends towards the opening of the ear canal such that the first sound output hole 301 located in the concave section 312 is close to the opening of the ear canal, thereby facilitating the transmission of sounds to the user.

In some embodiments, as shown in FIG. 3 and FIG. 6, the concave section 312 may include a first bending portion 3121 and a second bending portion 3122. The first bending portion 3121 is in bending connection with the second bending portion 3122, the speaker 32 may be disposed on the second bending portion 3122, and the hollow 314 may be formed between a top wall of the first bending portion 3121 and a top wall of the second bending portion 3122, in other words, the hollow 314 may be roughly V-shaped. The first connecting section 311 may be connected with one end of the first bending portion 3121 away from the second bending portion 3122, and the second connecting section 313 may be connected with one end of the second bending portion 3122 away from the first bending portion 3121.

The bending connection may be understood as that an extension direction of the first bending portion 3121 is different from an extension direction of the second bending portion 3122, or that the first bending portion 3121 and the second bending portion 3122 are disposed with an angle.

It should be noted that the top walls 315 of the first bending portion 3121 and the second bending portion 3122 include portions of the top wall 315 of the wearable member 30 located on the first bending portion 3121 and the second bending portion 3122, respectively.

Optionally, the concave section 312 may also be U-shaped or W-shaped, which is not specifically limited herein.

As shown in FIG. 4 and FIG. 5, the top wall 315 may include a first top surface 3151 located on the first bending portion 3121 and a second top surface 3152 located on the second bending portion 3122, and the first top surface 3151 and the second top surface 3152 may form the hollow 314.

The bottom wall 316 may include a first bottom surface 3161, a second bottom surface 3162, and a third bottom surface 3163. The first bottom surface 3161 is in bending connection with the second bottom surface 3162, and the second bottom surface 3162 is in bending connection with the third bottom surface 3163. The first bottom surface 3161 may be located on the first bending portion 3121, the second bottom surface 3162 and the third bottom surface 3163 may be located on the second bending portion 3122, and the first sound output hole 301 may be disposed on the second bottom surface 3162.

In a direction related to a space between the speaker 32 and the first sidewall 317 of the housing 31, a thickness of one end of the resonant cavity 303 close to the first sound output hole 301 may be greater than a thickness of one end of the resonant cavity 303 away from the first sound output hole 301 such that a length of the resonant cavity 303 is equivalently shortened and the resonant frequency of the resonant cavity 303 is increased, which makes a frequency response curve generated by the speaker 32 as flat as possible, and avoids discomfort caused by a resonance of the resonant cavity 303 when the wearable member 300 is in the wearing state.

Specifically, if the concave section 312 only includes the first sound output hole 301 communicating with the resonant cavity 303, which is equivalent to a case that the resonant cavity 303 is opened at one end and closed at the other end, and when the length of the resonant cavity 303 is equal to one fourth of a wavelength of a sound wave, a resonant peak may be generated by the resonant cavity 303, which may cause discomfort for the user when wearing the wearable device 100. Therefore, the resonant frequency of the resonant cavity 303 may be adjusted to a higher frequency. The higher the frequency, the shorter the wavelength, which means that the length of the resonant cavity should be as short as possible. In such cases, in a direction related to a space between the speaker 32 and the first sidewall 317 of the housing 31, the thickness of one end of the resonant cavity 303 close to the first sound output hole 301 may be greater than the thickness of one end of the resonant cavity 303 away from the first sound output hole 301. In this way, compared with the way that the space between the first sidewall 317 and the speaker 32 is equal in all places, the length of the resonant cavity 303 is shortened and the resonant frequency of the resonant cavity 303 is increased.

As shown in FIG. 7, the thickness of one end of the resonant cavity 303 close to the first sound output hole 301 may be greater than the thickness of one end of the resonant cavity 303 away from the first sound output hole 301. For example, the resonant cavity 303 has two different thicknesses, with a section close to the first sound output hole 301 having a first thickness and a section away from the first sound output hole 301 having a second thickness, wherein the first thickness may be greater than the second thickness, or the thickness of the resonant cavity 303 may gradually decrease from one end near the first sound output hole 301 to one end away from the first sound output hole 301.

Optionally, the thickness of the resonant cavity 303 may gradually decrease from one end of the resonant cavity 303 close to the first sound output hole 301 to the one end away from the first sound output hole 301, and a direction of the resonant cavity 303 from one end of the resonant cavity 303 close to the first sound output hole 301 to the one end away from the first sound output hole 301 may be designated as a length direction of the resonant cavity 303. It should be understood that the thickness of resonant cavity 303 may decrease linearly or nonlinearly along the length direction of the resonant cavity 303. For example, the thickness of the resonant cavity 303 may be unchanged in some sections at one end of the resonant cavity 303 close to the first sound output hole 301, while the thickness of the resonant cavity 303 may gradually decrease in some sections at one end of the resonant cavity 303 away from the first sound output hole 301; or the thickness of the resonant cavity 303 may gradually decrease in some sections at one end of the resonant cavity 303 close to the first sound output hole 301, while the thickness of the resonant cavity 303 may be unchanged in some sections at one end of the resonant cavity 303 away from the first sound output hole 301.

In some embodiments, the resonant cavity 303 may be directly formed between the speaker 32 and the first sidewall 317 of the housing 31, and a distance between one end of the first sidewall 317 of housing 31 close to the first sound output hole and a diaphragm plane of the speaker 32 may be greater than a distance between one end of the first sidewall 317 of the housing 31 away from the first sound output hole 301 and the diaphragm plane of the speaker 32.

The diaphragm plane of the speaker 32 may be approximately a plane, and the first sidewall 317 may be a sidewall with unequal thickness. An inner wall of the first sidewall 317 facing the speaker 32 may be an inclined plane, and a distance between the inner wall and the diaphragm plane may constitute the thickness of the resonant cavity 303.

In some embodiments, as shown in FIG. 7, the wearable member 30 may further include a shield 33, and the shield 33 may be disposed between the speaker 32 and the first sidewall 317 of the housing 31 and cooperate with the speaker 32 to form the resonant cavity 303. A distance between one end of the shield 33 close to the first sound output hole 301 and the diaphragm plane of the speaker 32 may be greater than a distance between one end of the shield 33 away from the first sound output hole 301 and the diaphragm plane of the speaker 32.

Further, the shield 33 may include a first cover 331 and a second cover 332 connected to each other, a distance between the first cover 331 and the diaphragm plane of the speaker 32 may be greater than a distance between the second cover 332 and the diaphragm plane of the speaker 32, and the first cover 331 may be disposed adjacent to the first sound output hole 301.

Both the first cover 331 and the second cover 332 may be equidistant from the diaphragm plane of the speaker 32, or a distance between the first cover 331 and the diaphragm plane of the speaker 32 may gradually decrease along the length direction of the resonant cavity 303, while a distance between the second cover 332 and the diaphragm plane of the speaker 32 may be unchanged along the length direction of the resonant cavity 303.

A distance between the second cover 332 and the diaphragm plane of the speaker 32 may be less than a distance between the first cover 331 and the diaphragm plane of the speaker 32 such that the length of the resonant cavity 303 is further equivalently shorten by the second cover 332, thereby increasing the resonant frequency of the resonant cavity 303.

In some embodiments, the first cover 331 may include a first plane 334 facing the speaker 32, and the second cover 332 may include a second plane 335 facing the speaker 32. The first plane 334 and the second plane 335 may be parallel to the diaphragm plane of the speaker 32, respectively, to simplify the structure of the shield 33 and facilitate manufacture.

Optionally, the first cover 331 may also include an inclined plane facing the speaker 32, and a distance between the inclined plane and the diaphragm plane of the speaker 32 may gradually decrease along the length direction of the resonant cavity 303, while the second housing 332 may include a second plane 335 facing the speaker, and the second plane 335 may be parallel to the diaphragm plane of the speaker 32.

The shield 33 may further include a third cover 333. The third cover 333 may be connected between the first cover 331 and the second cover 332. The third cover 333 may include a transition surface 336 facing the speaker 32, and two opposite sides of the transition surface 336 may be connected with the first plane 334 and the second plane 335, respectively. A distance between the transition surface 336 and the diaphragm plane of the speaker 32 may gradually decrease from the first plane 334 to the second plane 335 to smooth a side of the cover 33 facing the diaphragm plane of the speaker 32, thereby avoiding forming a sharp-edged structure that results in loss of output sound energy.

Figure 8:
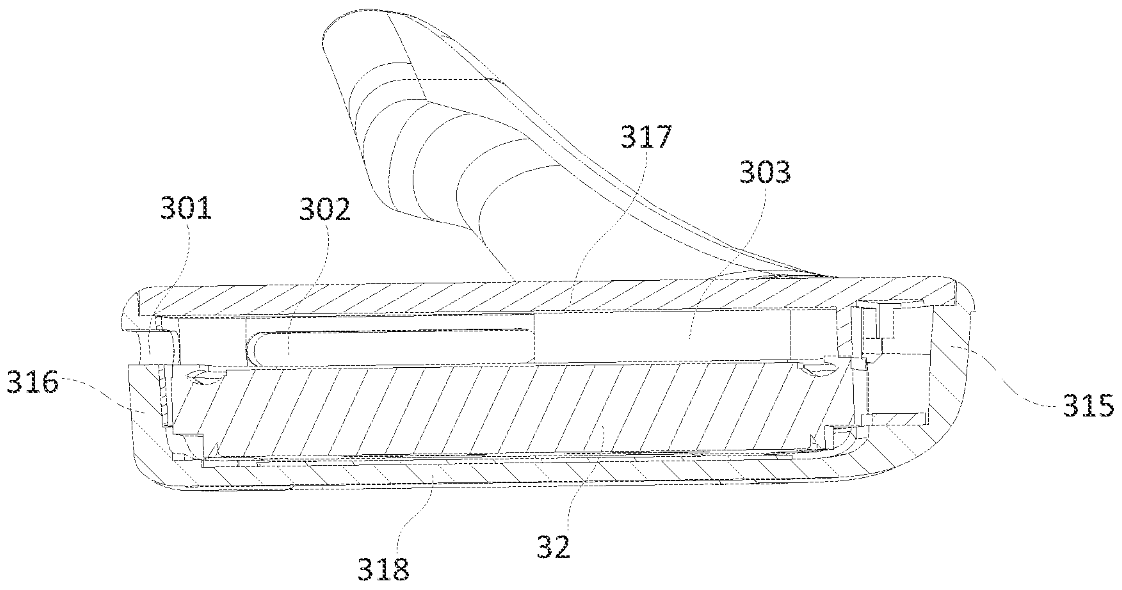
FIG. 8 is a schematic diagram illustrating another exemplary cross-sectional structure of the wearable member shown in FIG. 3 according to some embodiments of the present disclosure.

Further, as shown in FIG. 5 and FIG. 7, or FIG. 5 and FIG. 8, the concave section 312 may further include a second sound output hole 302, and the second sound output hole 302 may communicate with the resonant cavity 303. The first sound output hole 301 and the second sound output hole 302 may be located on adjacent sides of the resonant cavity 303, and the second sound output hole 302 may be configured to output sounds to improve the resonant frequency of the resonant cavity 303.

The speaker 32 may be disposed at the first bending portion 3121 or the second bending portion 3122.

In some embodiments, the speaker 32 may be disposed in the first bending portion 3121, the first sound output hole 301 may be disposed on the second bottom surface 3162, and the second sound output hole 302 may be disposed on the third bottom surface 3163. In such cases, the second sound output hole 302 effectively shortens the length of the resonant cavity 303 and improves the resonant frequency of the resonant cavity 303.

The second sound output hole 302 and the first sound output hole 301 may communicate with the resonant cavity 303, and the first sound output hole 301 and the second sound output hole 302 may be located on the adjacent sides of the resonant cavity 303, wherein the first sound output hole 301 and the second sound output hole 302 may be both configured to output sounds, and the second sound output hole 302 may be configured to shorten the length of the resonant cavity 303 such that the resonant frequency of the resonant cavity 303 is improved, which may make the frequency response curve generated by the speaker 32 as flat as possible, and avoid discomfort caused by a resonance in the resonant cavity 303 when the wearable member 300 is in the wearing state.

Specifically, if the concave section 312 only includes the first sound output hole 301 communicating with the resonant cavity 303, which is equivalent to a case that the resonant cavity 303 is opened at one end and closed at the other end, and when the length of the resonant cavity 303 is equal to one fourth of a wavelength of the sound wave, a resonant peak may be generated by the resonant cavity 303, which may cause discomfort for the user when wearing the wearable device 100. Therefore, the resonant frequency of the resonant cavity 303 may be adjusted to a higher frequency. The higher the frequency, the shorter the wavelength, which means that the length of the cavity should be as short as possible. In such cases, the second sound output hole 392 disposed on one side of the length of the resonant cavity 303 equivalently shortens the length of the resonant cavity 303 and increases the resonant frequency of the resonant cavity 303. In other words, a side where the second sound output hole 302 is located may be a side where the resonant cavity 303 has a cavity length.

Specifically, the first sound output hole 301 may be disposed on the second bottom surface 3162, and the second sound output hole 302 may be disposed on the third bottom surface 3163.

Figure 9:
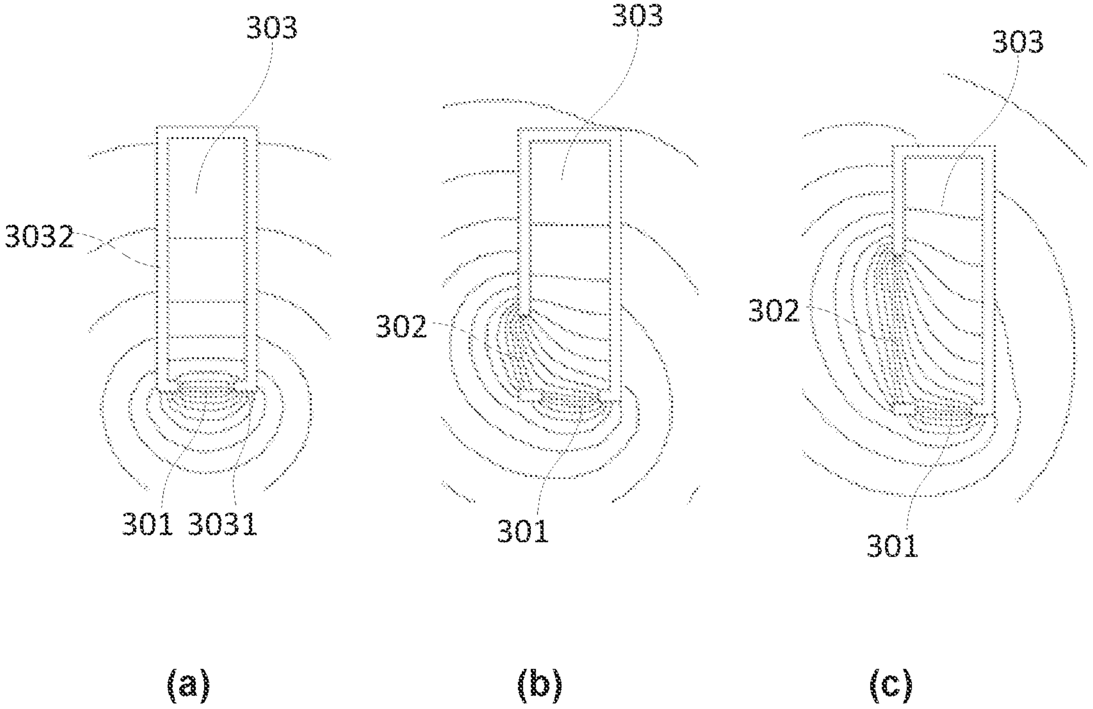
FIG. 9 is a schematic diagram illustrating cross-sectional structures of three exemplary types of a resonant cavity of the wearable member shown in FIG. 8 according to some embodiments of the present disclosure.

As shown in FIG. 9, FIG. 9 is a schematic diagram illustrating cross-sectional structures of three exemplary types of the resonant cavity of the wearable member shown in FIG. 8 according to some embodiments of the present disclosure.

A shape of a cross-section of the resonant cavity 303 perpendicular to a direction related to a space between the speaker 32 and the first sidewall 317 of the housing 31 may be a rectangle. The shape of the cross-section of the resonant cavity 303 may be a rectangle, a square, a parallelogram, a trapezoid, or the like, and the first sound output hole 301 and the second sound output hole 302 may be disposed on a first side 3031 and a second side 3032 of the rectangle adjacent to each other, respectively, such that the second sound output hole 302 equivalently shortens the length of the resonant cavity 303 along the extension direction of the second side, thereby improving the resonant frequency of the resonant cavity 303.

In some embodiments, the cross-section of resonant cavity 303 may be a rectangular, with the first side 3031 being a short side of the rectangle and the second side 3032 being a long side of the rectangle, and the second sound output hole 302 equivalently shortens the length of the resonant cavity 303 along the extension direction of the long side of the rectangle.

Further, the second sound output hole 302 may extend from one end of the second side 3032 close to the first side 3031 to the other end of the second side 3032 away from the first side 3031, which equivalently shortens the length of the resonant cavity 303 and enhances the sound output effect of the first sound output hole 301.

Optionally, the second sound output hole 302 may be disposed in a middle portion of the second side 3032.

Further, a ratio of a length of the second sound output hole 302 along an extension direction of the second side 3032 to a length of the second side 3032 may be greater than or equal to 0.1 and less than or equal to 0.7. The ratio being greater than or equal to 0.1 effectively improves the resonant frequency of the resonant cavity 303. The ratio being less than or equal to 0.7 avoids excessively weakening of indicators such as a strength or a rigidity of the second bending portion 3122. In such cases, the ratio being greater than or equal to 0.1 and less than or equal to 0.7 significantly improves the resonant frequency of the resonant cavity 303 and ensure that the indicators such as the strength or rigidity of the second bending portion 3122 still satisfy the standards.

Figure 10:
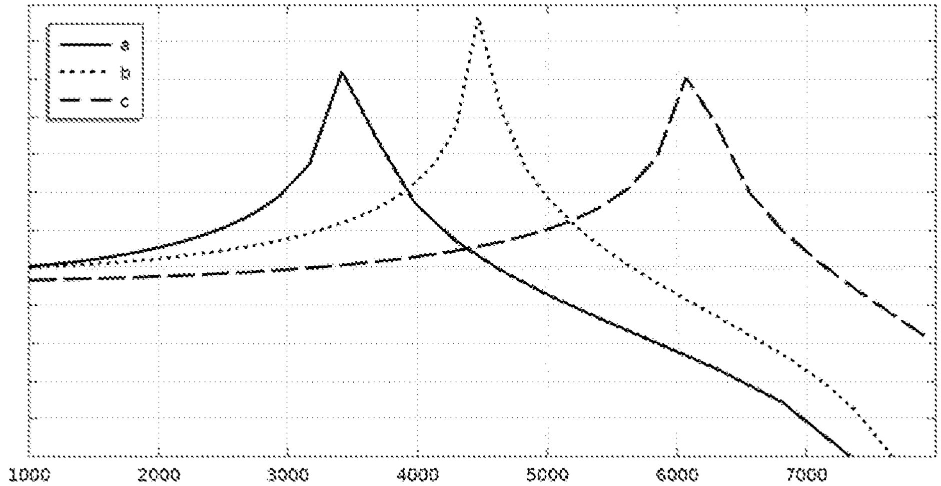
FIG. 10 is a graph illustrating frequency response curves corresponding to the three exemplary types of the resonant cavity shown in FIG. 9 according to some embodiments of the present disclosure.

For example, as shown FIGS. 9 and 10, FIG. 10 is a graph illustrating frequency response curves corresponding to three types of resonant cavity shown in FIG. 9 according to some embodiments of the present disclosure.

The resonant cavity 303 shown in (a) of FIG. 9 may not include the second sound output hole 302, and a corresponding resonant frequency of the resonant cavity 303 in FIG. 10 may be around 3.4 kHz. When a ratio of the length of the second sound output hole 302 along the extension direction of the second side 3032 to the length of the second side 3032 is 0.3 shown in (b) of FIG. 9, a corresponding resonance frequency of the resonant cavity 303 in FIG. 10 may be increased to 4.4 kHz; when the ratio of the length of the second sound output hole 302 along the extension direction of the second side 3032 to the length of the second side 3032 shown in (c) of FIG. 9 is 0.6, a corresponding resonance frequency of the resonant cavity 303 in FIG. 10 may be increased to 6.0 kHz. Accordingly, the second sound output hole 302 significantly improves the resonant frequency of the resonant cavity 303.

The ratio of the length of the second sound output hole 302 along the extension direction of the second side 3032 to the length of the second side 3032 may further be 0.1, 0.15, 0.2, 0.25, 0.35, 0.4, 0.5, 0.7, etc.

In some embodiments, the second sound output hole 302 and the first sound output hole 301 may be spaced on the bottom wall 316, i.e., there is a prism disposed between the second sound output hole 302 and the first sound output hole 301 on the bottom wall 316. The prism between the second sound output hole 302 and the first sound output hole 301 improves a strength of the bottom wall 316 and reduces a probability of deformation of the first wall 317 and the second wall 318.

In some embodiments, the second sound output hole 302 may physically communicate with the first sound output hole 301, i.e., on the bottom wall 316, the second sound output hole 302 and the first sound output hole 301 may be equivalent to being connected into a through hole and may be located on the adjacent sides of the resonant cavity 303.

As shown in FIG. 5 and FIG. 6, the first sidewall 317 may face the head of the user in the wearing state, and a side of the speaker 32 away from the resonant cavity 303 may be attached to the second sidewall 318 of the concave section 312 to reduce the thickness of the concave section 312 in a direction from the first sidewall 317 to the second sidewall 318.

Further, the second sidewall 318 may further include at least one soundproof hole 304. The soundproof hole 304 may be disposed on the second bending portion 3122. The speaker 32 may cover the soundproof hole 304, and the soundproof hole 304 may be combined with the first sound output hole 301 and/or the second sound output hole 302 to form a dipole. The soundproof hole 304, the first sound output hole 301, and second sound output hole 302 may be located on different sides of the speaker 32. In the wearing state, distances from the soundproof hole 304, the first sound output hole 301, and the second sound output hole 302 to the opening of the ear canal of the user may be different. The sound output from the soundproof hole 304 and the sound output from the first sound output hole 301 and/or the second sound output hole 302 satisfy specific conditions (e.g., a phase difference of approximately 180 degrees), which may form a dipole-like radiation. In a far-field, the sound output by the soundproof hole 304 and the sound output by the first sound output hole 301 and/or the second sound output hole 302 may have opposite phases and cancel each other, thereby reducing a volume of a sound leakage of the speaker 32 in the far-field and preventing the sound output by the speaker 32 from being heard by nearby people, thus making the wearable member 30 more private.

As shown in FIG. 3 and FIG. 6, the hollow 314 may include a first sound pickup hole 305. The wearable member 30 may further include a first sound pickup member 33, and the first sound pickup member 33 may be disposed on the first bending portion 3121 and configured to pick up sounds through the first sound pickup hole 305.

In some embodiments, the first sound pickup hole 305 may be disposed on the bottom of the hollow 314. Since a bottom region of the hollow 314 is least affected by a wind speed outside of the hollow 314, a wind noise of the sound input from the first sound pickup hole 305 located here may be the smallest.

When the user is in a motion state such as cycling, running, etc., the wind speed outside the hollow 314 may be relatively high, while an inside of the hollow 314 is less affected by the airflow outside the hollow 314 due to a shielding of the concave section 312. In such cases, by setting the first sound pickup hole 305 at the hollow 314, the wind noise of the sound obtained when the first sound pickup hole 305 picks up the sound is relatively low, which is beneficial for improving the quality of the obtained sound.

Optionally, the first sound pickup hole 305 may further be disposed at a waist of the hollow 314.

As shown in FIG. 3 and FIG. 6, the concave section 312 may further include a second sound pickup hole 306. The second sound pickup hole 306 may be located on the second sidewall 318. The wearable member 30 may further include a second sound pickup member 37 disposed on the second bending portion 3122 of the concave section 312 and located on a side of the speaker 32 away from one end of the first bending portion 3121. The second sound pickup member may be configured to pick up sounds through the second sound pickup hole.

An orientation of the second sound pickup hole 306 may be different from an orientation of the first sound pickup hole 305 such that environmental noise may be obtained through the second sound pickup hole 306. In such cases, a noise reduction operation may be performed based on the sounds obtained through the first sound pickup hole 305 and the second sound pickup hole 306 through algorithms to remove the environmental noise.

The wearable member 30 may include a circuit board 38 and a battery 39. The circuit board 38 may be disposed in the housing 31, the battery 39 may be disposed in the first connection section 311, and the battery 39, a controller, the first sound pickup member 33, the second sound pickup member 37, and the speaker 32 may be electrically connected with the circuit board 38.

In the present disclosure, in the direction related to the space between the speaker and the first sidewall of the housing, the thickness of one end of the resonant cavity close to the first sound output hole is greater than the thickness of one end of the resonant cavity away from the first sound output hole, which equivalently shortens the length of the resonant cavity, thereby improving the resonant frequency of the resonant cavity, making the frequency response curve generated by the speaker as flat as possible, and avoiding discomfort caused by the resonance of the resonant cavity during the sound production.

The second sound output hole and the first sound output hole communicating with the resonant cavity may be provided, and the first sound output hole and the second sound output hole may be located on the adjacent sides of the resonant cavity, wherein the first sound output hole and the second sound output hole may be configured to output sounds, and the second sound output hole 302 may be configured to shorten the length of the resonant cavity 303 such that the resonant frequency of the resonant cavity is improved, which makes the frequency response curve generated by the speaker as flat as possible and avoid discomfort caused by the resonance of the resonant cavity when the wearable member is worn by the user. The speaker may be disposed in the concave section, and the bottom wall of the concave section may include a first sound output hole such that the first sound output hole is closer to the opening of the ear canal in the wearing state, which improves the sound quality.

The basic concepts have been described. Obviously, for those skilled in the art, the detailed disclosure may be only an example and may not constitute a limitation to the present disclosure. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

What is claimed is:

1. A wearable member, comprising:

a housing including a concave section, wherein a top wall of the concave section forms a downward hollow in a wearing state, and a bottom wall of the concave section includes a first sound output hole; and a speaker disposed in the concave section, wherein a resonant cavity is formed between the speaker and a first sidewall of the housing, and the first sound output hole communicates with the resonant cavity.

2. The wearable member of claim 1, wherein in a direction related to a space between the speaker and the first sidewall of the housing, a thickness of one end of the resonant cavity close to the first sound output hole is greater than a thickness of one end of the resonant cavity away from the first sound output hole.

3. The wearable member of claim 2, wherein the thickness of the resonant cavity gradually decreases along a direction from the end of the resonant cavity closed to the first sound output hole to the end of the resonant cavity away from the first sound output hole.

4. The wearable member of claim 2, comprising a shield disposed between the speaker and the housing, wherein the resonant cavity is formed between the speaker and the shield; and a distance between one end of the shield close to the first sound output hole and a diaphragm plane of the speaker is greater than a distance between one end of the shield away from the first sound output hole and the diaphragm plane of the speaker.

5. The wearable member of claim 4, wherein the shield includes a first cover and a second cover connected to each other, a distance between the first cover and the diaphragm plane of the speaker is greater than a distance between the second cover and the diaphragm plane of the speaker, and the first cover is disposed adjacent to the first sound output hole.

6. The wearable member of claim 5, wherein the first cover has a first plane towards the speaker, the second cover has a second plane towards the speaker, and the first plane and the second plane are parallel to the diaphragm plane of the speaker, respectively.

7. The wearable member of claim 6, wherein the shield further includes a third cover, the third cover is connected between the first cover and the second cover, the third cover has a transition surface towards the speaker, two opposite edges of the transition surface connect the first plane and the second plane, respectively, and a distance between the transition surface and the diaphragm plane of the speaker gradually decreases from the first plane to the second plane.

8. The wearable member of claim 2, wherein the resonant cavity is directly formed between the speaker and the first sidewall of the housing, a distance between one end of the sidewall of the housing close to the first sound output hole and a diaphragm plane of the speaker is greater than a distance between one end of the sidewall of the housing away from the first sound output hole and the diaphragm plane of the speaker.

9. The wearable member of claim 1, wherein the bottom wall of the concave section includes the first sound output hole and a second sound output hole;

the first sound output hole is disposed corresponding to a bottom of the hollow;

the second sound output hole communicates with the resonant cavity;

the first sound output hole and the second sound output hole are relatively located on adjacent sides of the resonant cavity;

the first sound output hole and the second sound output hole are both configured for outputting sound;

and the second sound output hole is further configured for improving a resonant frequency of the resonant cavity.

10. The wearable member of claim 9, wherein a shape of a cross-section of the resonant cavity perpendicular to a direction related to a space between the speaker and the first sidewall of the housing is a rectangle, and the first sound output hole and the second sound output hole are disposed on a first side and a second side of the rectangle adjacent to each other, respectively.

11. The wearable member of claim 10, wherein a ratio of a length of the second sound output hole along an extension direction of the second side to a length of the second side is greater than or equal to 0.1 and less than or equal to 0.7.

12. The wearable member of claim 10, wherein the second sound output hole extends from one end of the second side close to the first side to the other end of the second side away from the first side; and the first side is a short side of the rectangle, and the second side is a long side of the rectangle.

13. The wearable member of claim 9, wherein the second sound output hole and the first sound output hole are disposed on the bottom wall at intervals; or the second sound output hole communicates with the first sound output hole on the bottom wall.

14. The wearable member of claim 9, wherein the concave section includes a first bending portion and a second bending portion, the first bending portion is in bending connection with the second bending portion, the hollow is formed between a top wall of the first bending portion and a top wall of the second bending portion, and the speaker is disposed on the second bending portion; and the bottom wall of the concave section includes a first bottom surface, a second bottom surface, and a third bottom surface, the first bottom surface is in bending connection with the second bottom surface, the second bottom surface is in bending connection with the third bottom surface, the first bottom surface is located at the first bending portion, the second bottom surface and the third bottom surface are located at the second bending portion, the first sound output hole is disposed on the second bottom surface, and the second sound output hole is disposed on the third bottom surface.

15. The wearable member of claim 14, wherein the first sidewall faces a head of a user in the wearing state, and a side of the speaker away from the resonant cavity is attached to a second sidewall of the concave section.

16. The wearable member of claim 15, wherein the second sidewall further includes at least one soundproof hole, the soundproof hole is disposed on the second bending portion, and the speaker covers the soundproof hole.

17. The wearable member of claim 15, wherein the hollow is arranged with a first sound pickup hole, the wearable member further includes a first sound pickup member, and the first sound pickup member is disposed on the first bending portion and configured to pick up sounds through the first sound pickup hole.

18. The wearable member of claim 17, wherein the second sidewall further includes a second sound pickup hole, the wearable member further includes a second sound pickup member, the second sound pickup member is disposed on the second bending portion and located at a side of the speaker away from an end of the first bending portion, and the second sound pickup portion is configured to pickup sounds through the second sound pickup hole.

19. A wearable device, comprising a visualization member and a wearable member, wherein the wearable member is connected with the visualization member, and the wearing member includes:

a housing including a concave section, wherein a top wall of the concave section forms a downward hollow in a wearing state, and a bottom wall of the concave section includes a first sound guiding hole; and a speaker disposed in the concave section, wherein a resonant cavity is formed between the speaker and a first sidewall of the housing, and the first sound guiding hole communicates with the resonant cavity.

20. The wearing device of claim 19, wherein in a spacing direction between the speaker and the first sidewall of the housing, a thickness of one end of the resonant cavity close to the first sound guiding hole is greater than a thickness of one end of the resonant cavity away from the first sound guiding hole.

* * * * *